US010583482B2

(12) United States Patent
Heugel et al.

(10) Patent No.: US 10,583,482 B2
(45) Date of Patent: Mar. 10, 2020

(54) DEVICE FOR PRODUCING A THREE-DIMENSIONAL OBJECT IN LAYERS

(71) Applicant: EOS GmbH Electro Optical Systems, Krailling (DE)

(72) Inventors: Martin Heugel, Landsberg am Lech (DE); Georg Fey, Munich (DE)

(73) Assignee: EOS GMBH ELECTRO OPTICAL SYSTEMS, Krailling (DE)

( * ) Notice: Subject to any disclaimer, the term of this patent is extended or adjusted under 35 U.S.C. 154(b) by 805 days.

(21) Appl. No.: 15/029,792

(22) PCT Filed: Nov. 7, 2014

(86) PCT No.: PCT/EP2014/074015
§ 371 (c)(1),
(2) Date: Apr. 15, 2016

(87) PCT Pub. No.: WO2015/071183
PCT Pub. Date: May 21, 2015

(65) Prior Publication Data
US 2016/0243618 A1      Aug. 25, 2016

(30) Foreign Application Priority Data
Nov. 15, 2013   (DE) .......................... 10 2013 223 411

(51) Int. Cl.
*B29C 64/286*   (2017.01)
*B29C 64/232*   (2017.01)
(Continued)

(52) U.S. Cl.
CPC .............. *B22F 3/1055* (2013.01); *B22F 3/24* (2013.01); *B29C 64/153* (2017.08);
(Continued)

(58) Field of Classification Search
CPC ......... B33Y 30/00; B33Y 40/00; B29C 64/25; B29C 64/259
See application file for complete search history.

(56) References Cited

U.S. PATENT DOCUMENTS 6,383,446 B1   5/2002   Tokita
7,777,155 B2   8/2010   Twelves et al.
(Continued)

FOREIGN PATENT DOCUMENTS

| CN | 101563197 A | 10/2009 |
|----|-------------|---------|
| CN | 101600560 A | 12/2009 |

(Continued)

OTHER PUBLICATIONS

PCT International Preliminary Report on Patentability and Written Opinion of the International Searching Authority, with English translation, dated May 17, 2016; 24 pages.

*Primary Examiner* — Joseph S Del Sole
*Assistant Examiner* — Thu Khanh T Nguyen
(74) *Attorney, Agent, or Firm* — Seyfarth Shaw LLP

(57) ABSTRACT

A modular system (1) for producing a three-dimensional object (2) by layerwise application and selective solidification of a pulverulent build material (13) contains a first module (30, 34-36; 40, 41) suitable for carrying out a first process used for the production of the three-dimensional object (2), and at least a second and a third module (30, 34-36; 40,41) suitable for carrying out a further process used for the production of the three-dimensional object (2). The first to third modules (30, 34-36; 40, 41) are configured so that the second or the third module, or both, can selectively and replaceably be connected to the first module in such a way that their housings are coupled to one another directly.

18 Claims, 3 Drawing Sheets

(51) Int. Cl.
*B22F 3/105* (2006.01)
*B22F 3/24* (2006.01)
*B29C 64/40* (2017.01)
*B29C 64/165* (2017.01)
*B29C 64/20* (2017.01)
*B29C 64/35* (2017.01)
*B29C 64/153* (2017.01)
*B29C 64/386* (2017.01)
*B33Y 30/00* (2015.01)
*B33Y 40/00* (2020.01)

(52) U.S. Cl.
CPC ............ *B29C 64/165* (2017.08); *B29C 64/20* (2017.08); *B29C 64/35* (2017.08); *B29C 64/386* (2017.08); *B29C 64/40* (2017.08); *B22F 2003/1056* (2013.01); *B22F 2003/1057* (2013.01); *B22F 2003/1059* (2013.01); *B33Y 30/00* (2014.12); *B33Y 40/00* (2014.12); *Y02P 10/295* (2015.11)

(56) References Cited

U.S. PATENT DOCUMENTS

| | | | |
|---|---|---|---|
| 8,220,704 | B2 | 7/2012 | Atkin et al. |
| 9,114,478 | B2 * | 8/2015 | Scott ................ B29C 64/20 |
| 2006/0156978 | A1 * | 7/2006 | Lipson ................ B33Y 10/00 |
| | | | 118/708 |
| 2008/0131104 | A1 | 6/2008 | Philippi |
| 2008/0138513 | A1 | 6/2008 | Perret |
| 2008/0150192 | A1 | 6/2008 | Perret |
| 2009/0056116 | A1 | 3/2009 | Presley et al. |
| 2011/0293771 | A1 | 12/2011 | Oberhofer |
| 2012/0211155 | A1 | 8/2012 | Wehning et al. |
| 2013/0004607 | A1 * | 1/2013 | Hoechsmann ........ B29C 64/35 |
| | | | 425/112 |
| 2013/0067721 | A1 | 3/2013 | Scannon et al. |
| 2013/0193620 | A1 | 8/2013 | Mironets |

FOREIGN PATENT DOCUMENTS

| | | |
|---|---|---|
| CN | 102917862 A | 2/2013 |
| DE | 102004057866 | 6/2006 |
| DE | 102004057866 A1 | 6/2006 |
| DE | 102005024790 A1 | 12/2006 |
| DE | 102007047326 | 4/2009 |
| DE | 102007047326 A1 | 4/2009 |
| DE | 102004057866 B4 | 6/2010 |
| DE | 102009036153 | 2/2011 |
| DE | 102009036153 A1 | 2/2011 |
| DE | 102009056696 | 6/2011 |
| DE | 102009056696 A1 | 6/2011 |
| DE | 102012009071 | 11/2013 |
| DE | 102012009071 A1 | 11/2013 |
| EP | 2289652 A1 | 8/2009 |
| EP | 2289652 | 3/2011 |
| WO | 2008128502 | 10/2008 |
| WO | 2008128502 A2 | 10/2008 |
| WO | 2010026397 | 3/2010 |
| WO | 2010026397 A1 | 3/2010 |
| WO | 2014165735 A1 | 10/2014 |

* cited by examiner a)

b)

DEVICE FOR PRODUCING A THREE-DIMENSIONAL OBJECT IN LAYERS

TECHNICAL FIELD OF THE INVENTION

The present invention relates to an apparatus for the layerwise production of a three-dimensional object by layerwise solidification of building material on the positions corresponding to the cross section of the object to be produced in the respective layer.

BACKGROUND OF THE INVENTION

A method for the layerwise production of a three-dimensional object, which is known by the name "selective laser sintering", and a corresponding apparatus for carrying out the method, are described for example in DE 10 2005 024 790 A1.

DE 10 2004 057 866 B4 discloses an apparatus for the layerwise production of a three-dimensional object, the housing of which is divided into at least two housing sections. The actual production process takes place in a first housing section. A second housing section is used as an unpacking station for the completed object.

U.S. Pat. No. 6,383,446 B1 describes a system for electrical sintering, which is formed from a plurality of workstations. In one embodiment, a preheating unit, a sintering unit and a cooling unit are arranged next to one another and are connected to one another. The units can be isolated from one another and from the external surroundings by closable sliders.

Depending on the material used and the operating conditions resulting therefrom (for example production temperature, gas purity, etc.) and the number of apparatuses for the layerwise production of a three-dimensional object which are used in a production facility, there is a need to be able to adapt the configuration of the apparatuses present as flexibly as possible to the required conditions.

SUMMARY OF THE INVENTION

The object of the present invention is to provide an apparatus for the layerwise production of a three-dimensional object, which allows flexible adaptation to different conditions.

The object is achieved by an apparatus as claimed in claim 1. Refinements of the invention are respectively specified in the dependent claims.

By virtue of the fact that the first to third modules are configured so that the second or the third module, or both, can selectively and replaceably be connected to the first module in such a way that their housings are coupled to one another directly, it is possible to combine and interchange individual workstations flexibly in a different arrangement.

Other features and expediencies of the invention may be found in the description of exemplary embodiments with the aid of the appended drawings.

DETAILED DESCRIPTION OF THE EMBODIMENTS

Figure 1:
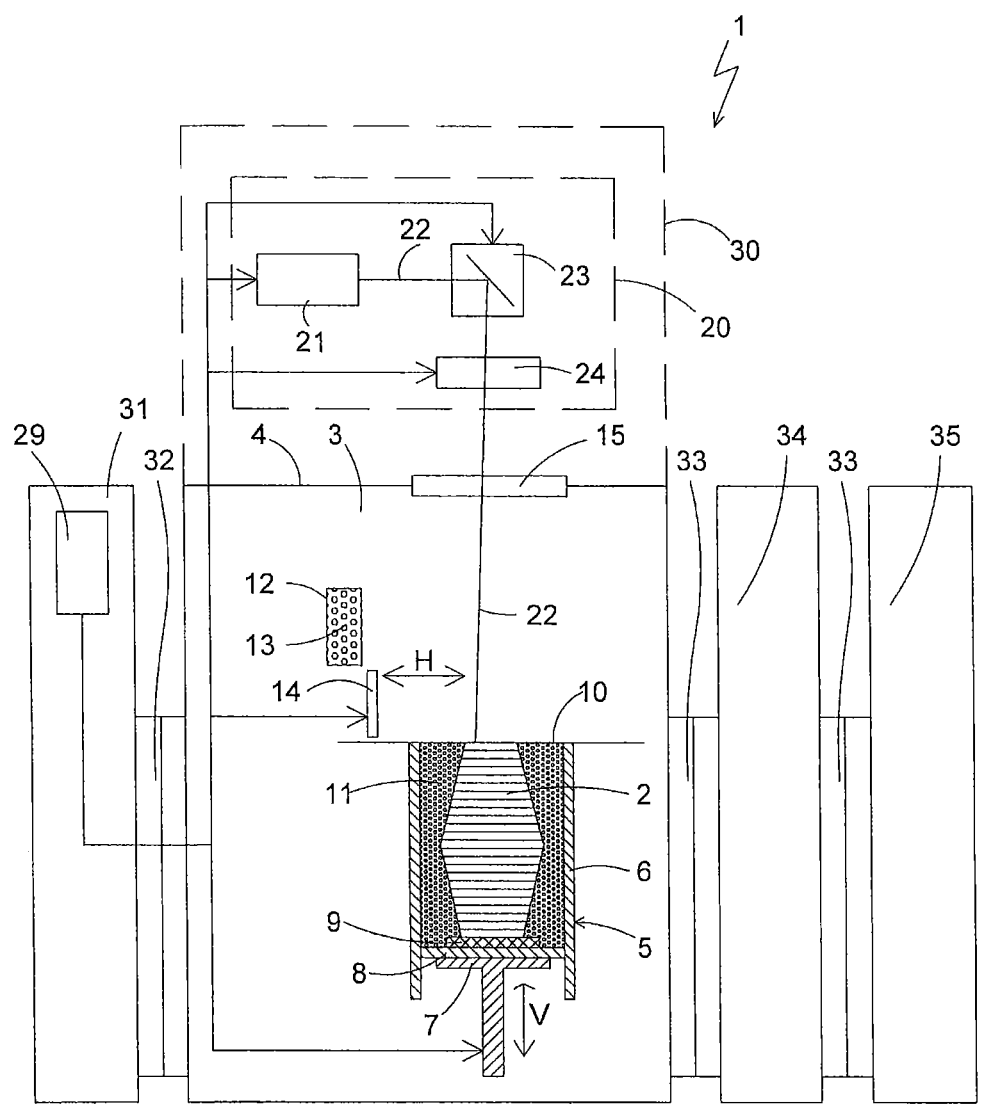
FIG. 1 is a schematic view, partially represented in section, of an apparatus for the layerwise production of a three-dimensional object according to a first embodiment of the present invention.

An exemplary embodiment of an apparatus according to a first embodiment of the present invention will be described below with reference to FIG. 1. The apparatus represented in FIG. 1 is a laser sintering or laser melting apparatus 1. For production of the object 2, it contains a process chamber 3 having a chamber wall 4.

A container 5, which is open at the top and has a wall 6, is arranged in the process chamber 3. It is configured as a replaceable container, which means that it can be removed from the process chamber 3 and placed into the latter again. Arranged in the container 5, there is a carrier 7 which can be moved in a vertical direction V and on which a base plate 8, which closes the replaceable container underneath and therefore forms its bottom, is fitted. The base plate 8 may be a plate which is formed separately from the carrier 7 and is fastened on the carrier 7, or it may be formed integrally with the carrier 7. Depending on the powder and process used, a production platform 9 on which the object 2 is produced may also be fitted on the base plate 8. The object 2 may, however, also be produced on the base plate 8 itself, which is then used as the production platform.

In FIG. 1, the object 2 to be formed on the production platform 9 in the container 5 is represented below a working plane 10 in an intermediate state with a plurality of solidified layers, surrounded by building material 11 which remains unsolidified. Furthermore, a storage container 12 for a pulverulent build material 13, which can be solidified by electromagnetic radiation, and a coater 14, which can be moved in a horizontal direction H, for applying the building material 13 onto the working plane 10 are arranged in the process chamber 3. On its upper side, the wall 4 of the process chamber 3 contains an entry window 15 for the radiation used to solidify the powder.

The laser sintering apparatus 1 furthermore contains an illumination apparatus 20 having a laser 21, which generates a laser beam 22 that is deviated by means of a deviating apparatus 23 and is focused by a focusing apparatus 24 via the entry window 15 onto the working plane 10.

The laser sintering apparatus 1 furthermore contains a control unit 29, by means of which the individual component parts of the apparatus are controlled in a coordinated fashion in order to carry out the production process. The control unit may contain a CPU, the operation of which is controlled by a computer program (software).

According to the present invention, the laser sintering apparatus 1 is constructed as a flexible modular system which is composed of individual modules. In this case, the main functions of the production method are distributed between different workstations, which can flexibly be connected to one another in any desired combination and can be replaced with one another. Production in this case relates not only to the actual construction of the object from the powder, but also includes all steps used for preparing the construction and for finishing the object.

The process chamber 3 with the components contained therein and the illumination unit 20 together form a manufacturing station 30, which forms a first module of the modular system.

The control unit 19 may be fitted in a control cabinet 31 which is formed separately from the manufacturing station 30 and, besides the control, also performs the power supply of the apparatus. The switchgear cabinet 31 is coupled directly to the manufacturing station 30 via a control interface 32.

Further modules are formed by individual workstations in which steps of the method used to produce the object other than the direct process of constructing the object from the powder are carried out. These workstations are respectively connected via a module interface 33 to one another and/or to the manufacturing station 30 in such a way that their housings are directly coupled to one another.

FIG. 1 shows as an example two additional workstations, namely an unpacking station 34, which is connected to the manufacturing station 30 via a module interface 33, and a setup station 35, which is connected to the setup station 35 via a module interface 33.

So that the individual workstations can be replaced with one another freely and can be connected to one another in any combination, they must have a defined module interface by which the housings of two neighboring stations can be coupled directly to one another. Each of the module interfaces 33 contains at least one opening, through which the replaceable container 5 can be taken from one station into another, a device for direct mechanical coupling of the housings of the individual stations to one another, which may for example be formed as a connecting flange having any desired fastening means, a device for electrical connection of the stations to one another, for example an electrical control and power connector, and optionally a device for hydraulic and/or pneumatic connection of the stations to one another, for example hydraulic and/or pneumatic couplers. The control connector may in this case also be configured as a bus coupler.

The module interfaces 33 in all the stations must be compatible with one another, that is to say for each station both the mechanical dimensions (for example size and position of the opening, size of a connecting flange and position of the fastening means) and the electrical, hydraulic and pneumatic connections (dimensions and position of the control and power connectors as well as of the hydraulic and pneumatic couplers) must be compatible with one another.

The module interface 33 may contain an element by which the alignment of neighboring modules, for example a relative position between them in the horizontal and/or vertical direction or an angular setting with respect to one another can be established. This alignment apparatus may for example contain spherical head centering, guides, stops and the like.

Furthermore, the module interface 33 may also contain a barrier with which the respective workstation can be isolated in a gastight fashion from a following station. In this way, the gas spaces of the individual stations can be separated from one another so that, for example, it is possible to flush only some of the stations with a protective gas while the other stations are exposed to the surrounding air. This makes it possible to save on protective gas. Different protective gases may also be used in different stations. If there are two barriers between two stations, the respective atmosphere may be maintained even when the two stations are separated from one another.

In the individual stations, there is a feed apparatus (not shown in the figures) by means of which the replaceable container 5 can be fed through the openings of the module interfaces 33 from one station into an adjacent station. This feed device may for example be implemented using rotatable rollers, a conveyor belt or the like. In the case of a rail-based feed system, the track widths of the individual stations must also be matched to one another.

During operation of the configuration shown in FIG. 1, an empty replaceable container 5 is initially provided in the setup station 35. Then, by means of the internal feed apparatus, this container is then transported through the unpacking station 34 into the process chamber 3 in order to produce the object 2. For each layer, the carrier 7 is initially lowered by the desired layer thickness, and then a layer of the pulverulent build material 13 is applied by using the coater 14. Subsequently, the cross section of the object to be produced is scanned by the laser beam 22 so that the pulverulent build material 13 is solidified at these positions. These steps are repeated until the object is completed. Subsequently, the replaceable container 5 is brought by means of the internal feed device into the unpacking station 34, in which the surrounding powder 11 remaining unsolidified is removed from the object 2. Subsequently, the replaceable container 5 is brought from the unpacking station 34 into the setup station 35, in which the object 2 is removed.

Figure 2:
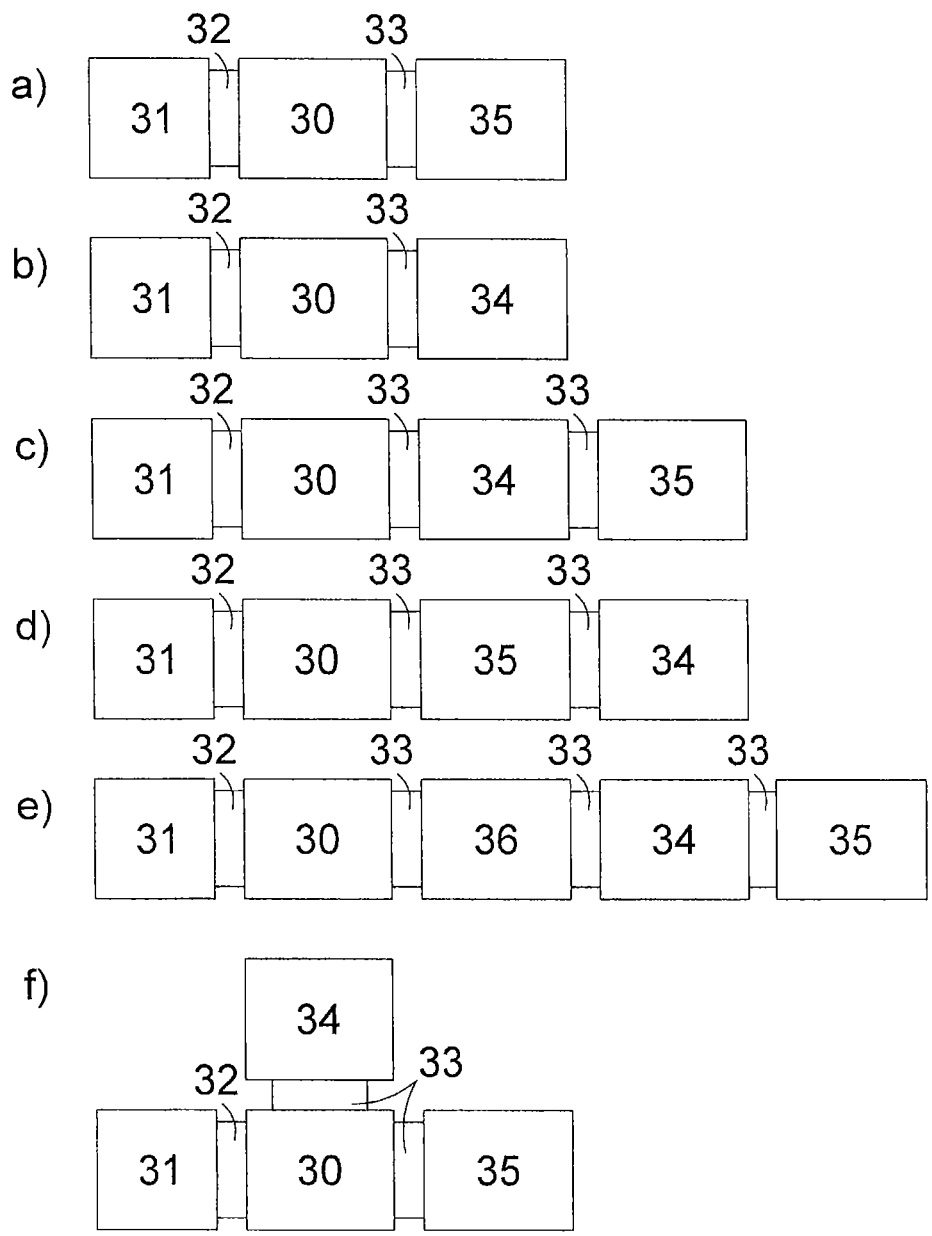
FIG. 2 is a schematic view of different arrangements of workstations according to the first embodiment.

FIG. 2 is a schematic view of various arrangements of workstations according to a first embodiment.

FIG. 2a) shows a setup station 35 coupled to the manufacturing station 30. The unpacking station 34 shown in FIG. 1 is omitted here. The unpacking of the object from the unsolidified powder is in this configuration carried out in the manufacturing station itself, in the setup station or in an external station.

FIG. 2b) shows an unpacking station 34 coupled to the manufacturing station 30. The setup station 35 shown in FIG. 1 is omitted here. The setup process is in this configuration carried out in the manufacturing station itself.

FIGS. 2c) and 2d) show two configurations in which both an unpacking station 34 and a setup station 35 are present. In this case, there is a free choice as to which of the two stations is coupled directly to the manufacturing station 30 and which is coupled to the other station. The configuration of FIG. 2c) in this case corresponds to the structure shown in FIG. 1, and the configuration of FIG. 2d) is reversed in terms of the order of the stations.

FIG. 2e) shows a configuration in which there is provided a replacement station 36 in addition to the stations shown in FIG. 2c). Here as well, the order of the stations can be selected freely.

The replacement station 36 is configured for the replacement of replaceable containers 5. For example, a replaceable container 5 prepared in the setup station 35 is brought through the unpacking station 34 into the replacement station 36 while an object is being produced in another replaceable container in the manufacturing station 30. At the end of the production of the object, the filled replaceable container is brought from the manufacturing station 30 into the replacement station 36, and the empty replaceable container is brought from the replacement station 36 into the manufacturing station 30, so that the production of a new object can be started immediately. The full replaceable container is then brought into the unpacking station 34, in which the object is unpacked.

FIG. 2e) shows a configuration in which the stations shown in FIG. 2c) are not arranged successively in a row, but are coupled directly to the manufacturing station 30.

Arbitrary combinations of the configurations shown are also possible, in which case any desired number of workstations may be provided. More than one workstation may be coupled not only to the manufacturing station 30, but also to any of the other workstations. For example, in the configuration shown in FIG. 2e), further stations may be coupled to the replacement station 36.

The described workstations are intended only as examples and are not meant to be restrictive. Any other desired stations may be provided, for example a station for cooling the object after removal from the manufacturing station 30 and before transport into the unpacking station 34, a station for finishing the object unpacked in the unpacking station 34, etc.

Even though stations in which different method steps used for production of the three-dimensional object are carried out have been described in the first embodiment, the present invention is not restricted thereto. There may for example also be modules in which the same method step is carried out in a different way.

For example, it is possible to provide one manufacturing station and two or more different unpacking stations, in which the unpacking is carried out in different ways, for example in one by suction of the powder remaining unsolidified and in the other by blowing. One or other unpacking station is connected selectively and replaceably to the manufacturing station.

On the other hand, however, it is also possible to provide two or more different manufacturing stations, for example one for a standard process, one with a high-temperature process chamber with additional heating, and one with an increased range of the vertical displacement of the carrier in order to produce larger objects. Any desired one of these manufacturing stations may be connected selectively and replaceably, for example to an unpacking station.

In general, it is possible to provide any desired number of modules which are suitable for carrying out the method steps used to produce the three-dimensional object.

By virtue of this modular structure of the laser sintering installation, in which different method steps used to produce the three-dimensional object are divided between different workstations (modules), which can be combined arbitrarily with one another owing to a defined interface between the modules, it is possible to adapt the laser sintering installation flexibly to different requirements when producing the three-dimensional objects.

Because the housings of the individual modules are coupled directly to one another, the replaceable container can be transported between the individual stations without being exposed to a surrounding atmosphere between these.

Figure 3:
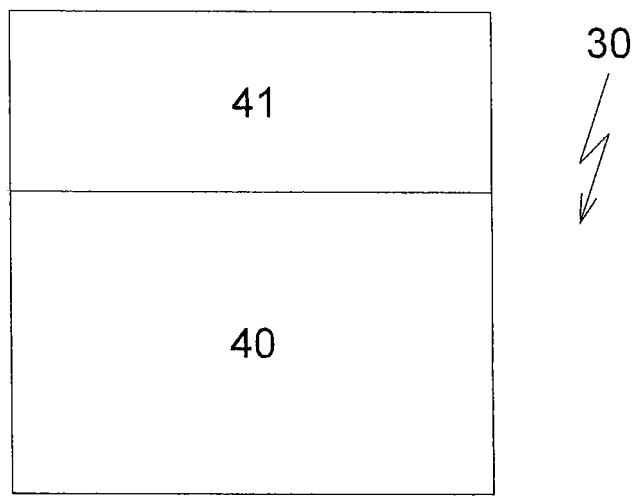
FIG. 3 is a schematic view of a modular structure of a workstation according to a second embodiment of the present invention.
Figure 3:
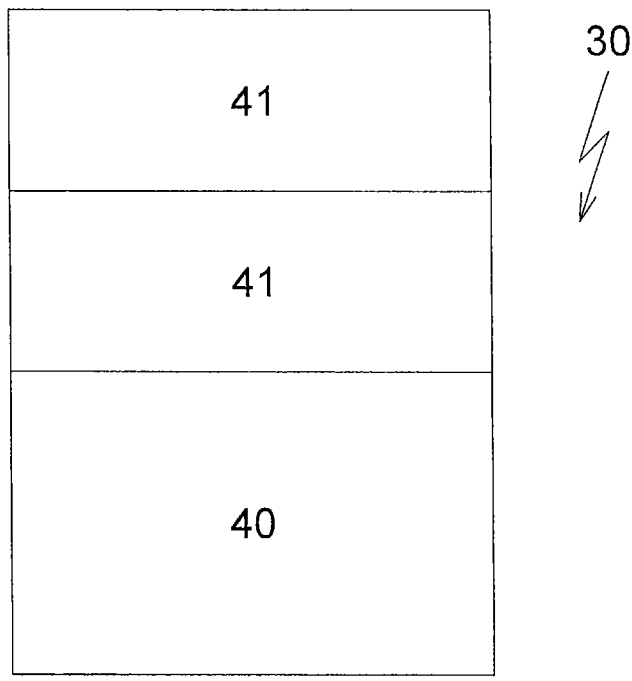

However, it is possible not only for the entire system but also for individual workstations to be configured modularly. FIG. 3 is a schematic view of a modular structure of a workstation according to a second embodiment. As an example of a modularly constructed workstation, the manufacturing station 30 is represented in FIG. 3.

As shown in FIG. 3a), the modularly constructed manufacturing station 30 is formed from a base unit 40 and an attachable module 41, which is configured so that it can be fitted on to the base unit 40.

The interface between the base unit 40 and the attachable module 41 may in this case be formed at different positions. For example, the base module may contain the components lying below the working plane 10 in FIG. 1, i.e. inter alia an apparatus for receiving the replaceable container 5 and for vertical displacement of the carrier 7. The attachable module then contains inter alia the coater 14 and the irradiation apparatus 20 for selective irradiation of a powder layer applied by the coater 14.

The base unit 40 may, however, also contain the entire process chamber 3 with the components contained therein, as are described above with reference to FIG. 1. The attachable module 41 fitted onto the process chamber 3 then contains the irradiation apparatus 20.

According to the invention, a plurality of attachable modules 41 different to one another are provided, which may be replaced with one another in a freely selectable way. While one attachable module 41 contains the irradiation apparatus 22 shown in FIG. 1, another attachable module 41 may for example contain an irradiation apparatus which can generate and independently control two laser beams 22 (two-head system). A further attachable module 41 may, for example, contain an irradiation apparatus which can generate and independently control four laser beams 22 (four-head system). These various attachable modules 41 can be replaced rapidly and flexibly with one another.

In the first example, in which the upper part of the process chamber 3 is part of the attachable module 41, the individual attachable modules contain entry windows 15 which are adapted to the respective irradiation apparatus 20. In the second example, in which the base unit comprises the entire process chamber 3, wherever one of the aforementioned irradiation apparatuses can input a laser beam, the upper side of the process chamber 3 contains an individual entry window 15, or a single entry window 15 which is large enough for all intended variants of irradiation apparatuses 20 to be used.

In order to achieve accurate positioning and repetition accuracy of the position, the attachable module 41 bears on the process chamber 3 used as a base unit 40 via a three-point support. In this case, it is possible to adjust accurately the alignment of the attachable module 41 with respect to the base unit 40, and thereby in particular to avoid tilting of the modules in relation to one another. Adjustable alignment of the attachable module 41 with respect to the base unit may, however, be achieved by a different alignment element than by a three-point support.

In this case, it is preferable to provide a casing by means of which the connecting position between the base unit 40 and the attachable module 41 can be closed in a gastight fashion. Such sealing is necessary, in particular, when the interface between the base unit and the attachable module lies inside the process chamber 3. The sealing may, for example, be carried out by means of a sealing ring made of a resilient material, which is compressed by the weight of the attachable module that bears thereon with its housing, and which therefore seals the transition between the base unit and the attachable module.

While examples of the second embodiment in which different attachable modules 41 can be fitted selectively and replaceably onto a base module have been described above, the modular structure moreover also makes it possible to use different base modules 40. For example, the same attachable module 41 may be fitted selectively and replaceably onto one of different base modules, of which, for example, as in the first embodiment one is configured for a standard process, another contains an additional heater for a high-temperature process, and yet another has an increased range of the vertical displacement of the carrier for producing larger objects.

A manufacturing station 30 modularly constructed in this way can accordingly be adapted flexibly to different requirements of the irradiation apparatus.

Not only the manufacturing station 30, but all other stations may however be constructed modularly. A modularly constructed unpacking station will be described below as a further example.

In the unpacking station, the base unit 40 contains an apparatus for receiving the replaceable container 5 and for displacing the production platform 9 upward inside the replaceable container 5. Two attachable modules 41 contain different apparatuses for removing the powder 11 remaining unsolidified from the completed object 2, for example a suction apparatus and a blowing apparatus. As soon as the object 5 surrounded by unsolidified powder 11 protrudes beyond the upper edge of the replaceable container 5 because of the displacement of the production platform 9, the excess powder is suctioned or blown away.

A combination of the two examples represented is, however, also possible. For example, an attachable module 41 which is suitable for irradiation of the applied layer, or an attachable module 41 which is suitable for removing the excess powder, may selectively be fitted onto the process chamber 3 used as a base unit 40.

The second embodiment may be implemented independently or alternatively combined with the first embodiment, i.e. the modular apparatus which is formed from a base unit and an attachable module may be either a complete laser sintering installation in a housing or alternatively any one or more of the modular workstations into which the laser sintering installation of the first embodiment is subdivided.

Even though a replaceable container is used in the embodiment described above, the present invention is not restricted thereto. It may also be applied to cases in which there is no replaceable container. In these cases, only the production platform on which the object is constructed is transported to and fro between the workstations.

The represented workstations 34 to 36 and the described variants of the attachable module are to be understood as examples and are not restrictive. Any other desired modules which carry out functions for the production of three-dimensional objects by means of layerwise application and selective solidification of a pulverulent build material may be used.

Even though the present invention has been described with reference to a laser sintering or laser melting apparatus, it is not restricted to laser sintering or laser melting. It may be applied to any desired method for producing a three-dimensional object by means of layerwise application and selective solidification of a pulverulent build material by the action of energy. The laser may for example be a gas or solid-state laser, a laser diode or a laser-diode array. In general, it is possible to use any illumination device with which energy can be applied selectively to a powder layer. Instead of a laser, it is possible for example to use a different light source, an electron beam or any other energy or radiation source which is suitable for solidifying the pulverulent build material. The invention may also be applied to selective mask sintering, in which, instead of a displaceable laser beam, a mask and an extended light source are used, or to absorption or inhibition sintering. Instead of the introduction of energy, the selective solidification of the applied powder may, for example, also be carried out by the application of an adhesive. In general, the invention applies to the production of an object by means of layerwise application and selective solidification of a pulverulent build material, independently of the way in which the powder is solidified, in particular also by 3D printing or inkjet printing methods.

Various types of powder may be used as the building material, in particular metal or plastic powders, or filled or mixed powders.

The invention claimed is:

1. A modular system for producing a three-dimensional object by an additive manufacturing process through powder bed fusion wherein the object is built through layerwise application and selective solidification of a pulverulent build material using a focused energy source which is directable to a build surface for solidifying consecutive layers according to cross-sections of the object, comprising:
   a first module for carrying out a first process used for the production of the three-dimensional object, the first module having an area therein receiving a manufacturing station for layerwise application and selective solidification of the pulverulent build material on a production platform and/or in a replaceable container; and
   at least a second and a third module for each carrying out a further process used for the production of the three-dimensional object, each second and third module having a housing with at least one opening sized to allow the manufacturing station to pass therethrough and into an interior of each second and third module,
   wherein the first, second, and third modules are configured so that the second or the third module, or both, can selectively and replaceably be connected to the first module in such a way that the housings of the second and/or third module are coupled to one another directly, and
   the first, second, and third modules including an internal transfer, device configured to transport the production platform and/or the replaceable container between the first module and the second or third module.

2. The modular system of claim 1, wherein the second and/or the third module includes:
   a setup station for preparing a production platform or a replaceable container; and/or
   a replacement station for replacing production platforms or replaceable containers; and/or
   an unpacking station for removing powder remaining unsolidified from the object when completed; and/or
   a station for finishing the object when unpacked.

3. A modular system for producing a three-dimensional object by an additive manufacturing process through powder bed fusion wherein the object is built through layerwise application and selective solidification of a pulverulent build material using a focused energy source which is directable to a build surface for solidifying consecutive layers according to cross-sections of the object, comprising:
   a first module for carrying out a first process used for the production of the three-dimensional object; and
   at least a second and a third module for each carrying out a further process used for the production of the three-dimensional object, the second and the third module each having an area therein receiving a manufacturing station for layerwise application and selective solidification of the pulverulent build material on a production platform and/or in a replaceable container, the first module having a housing with at least one opening sized to allow the manufacturing station to pass therethrough into the interior of the first module,
   wherein the first, second and third modules are configured so that the second or the third module, or both, can selectively and replaceably be connected to the first module in such a way that the housings of the second and/or third modules are coupled to one another directly,
   the first, second, and third modules including an internal transfer device configured to transport the production platform and/or the replaceable container between the first module and the second or third module.

4. The modular system of claim 3, wherein the first module includes:

a setup station for preparing a production platform or a replaceable container; and/or a replacement station for replacing production platforms or replaceable containers; and/or an unpacking station for removing powder remaining unsolidified from the object when completed; and/or a station for finishing the object when unpacked.

5. The modular system of claim 1, further comprising a barrier between two adjacent modules with which the gas spaces of the two adjacent modules can be separated from one another.

6. The modular system of claim 5, wherein the barrier includes two barriers provided between adjacent modules with which the gas spaces of the adjacent modules remain sealed even when modules are separated from one another.

7. A modular system for producing a three-dimensional object by an additive manufacturing process through powder bed fusion wherein the object is built through layerwise application and selective solidification of a pulverulent build material using a focused energy source which is directable to a build surface for solidifying consecutive layers according to cross-sections of the object, comprising:

a first module for carrying out a first process used for the production of the three dimensional object; and at least a second and a third module for each carrying out a further process used for the production of the three-dimensional object, wherein the first, second, and third modules are configured so that the second or the third module, or both, can selectively and replaceably be connected to the first module in such a way that the housings of the second and/or third modules are coupled to one another directly, and the first, second, and third modules are configured in such a way that the second or the third module can be selectively and replaceably placed on the upper side of the first module.

8. The modular system of claim 7, wherein the first module contains an apparatus for receiving a production platform and/or a replaceable container, on or in which the object is intended to be built up by layerwise application and selective solidification of a powdered building material;

the second and the third modules contain different apparatuses suitable for solidification of the powdered building material; and the second or third module is configured so that the second or third module can be fitted onto the first module in such a way as to cause solidification of the pulverulent build material.

9. The modular system of claim 8, wherein the different apparatuses suitable for solidification of the pulverulent build material contain different irradiation apparatuses configured to emit radiation suitable for solidification of the pulverulent build material.

10. The modular system of claim 7, wherein the first module contains an unpacking station;

the second and third modules contain different unpacking devices, which are configured for removing pulverulent build material remaining unsolidified from the object; and the second or third module is configured to be fitted onto the first module in such a way to cause removal of the pulverulent build material from the object.

11. A modular system for producing a three-dimensional object by an additive manufacturing process through powder bed fusion wherein the object is built through layerwise application and selective solidification of a pulverulent build material, using a focused energy source which is directable to a build surface for solidifying consecutive layers according to cross-sections of the object, comprising:

a first module for carrying out a first process used for the production of the three-dimensional object; and at least a second and a third module for each carrying out a further process used for the production of the three-dimensional object, wherein the first, second, and third modules are configured so that the second or the third module, or both, can selectively and replaceably be connected to the first module in such a way that the housings of the second and/or third modules are coupled to one another directly, and the first to third modules are configured in such a way that the first module can be placed selectively and replaceably on the upper side of the second or the third module.

12. The modular system of claim 11, wherein the first module contains an apparatus suitable for solidification of the pulverulent build material, the second and the third modules contain different apparatuses for receiving a production platform and/or a replaceable container, on or in which the object is intended to be built up by layerwise application and selective solidification of a pulverulent build material, and the first module is configured so that the first module can be fitted onto the second or third module in such a way to cause solidification of the pulverulent build material.

13. The modular system of claim 12, wherein the apparatus suitable for solidification of the pulverulent build material contains an irradiation apparatus which is configured to emit radiation suitable for solidification of the pulverulent build material.

14. The modular system of claim 7, wherein the first module is configured to be fitted onto the upper side of the second or third module by a three-point support.

15. The modular system of claim 7, further comprising a junction between the first module and the second or third module that is sealed by a sealing device.

16. The modular system of claim 15, further comprising an alignment element for aligning two abutting modules with respect to one another.

17. The modular system of claim 1, further comprising additional modules that are selectively flexibly coupleable.

18. The modular system of claim 1, further comprising at least one interface module adapted to couple the second and/or third module to the first module, each interface module having an opening through which the production platform and/or the replaceable container can be passed.

* * * * *